J. GODDARD.
PHOTOGRAPHIC CAMERA.
APPLICATION FILED JULY 27, 1912.
1,068,889.
Patented July 29, 1913.
2 SHEETS—SHEET 1.
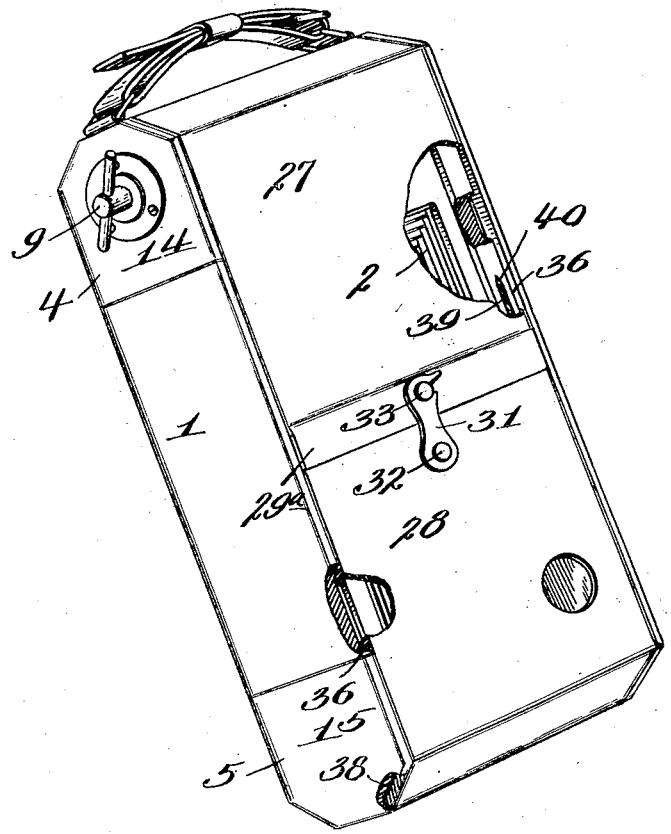
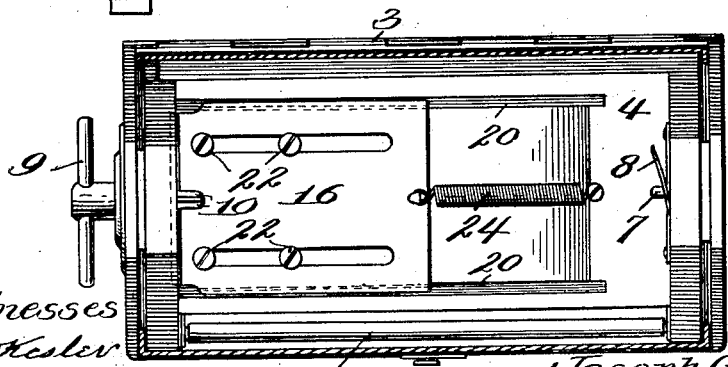

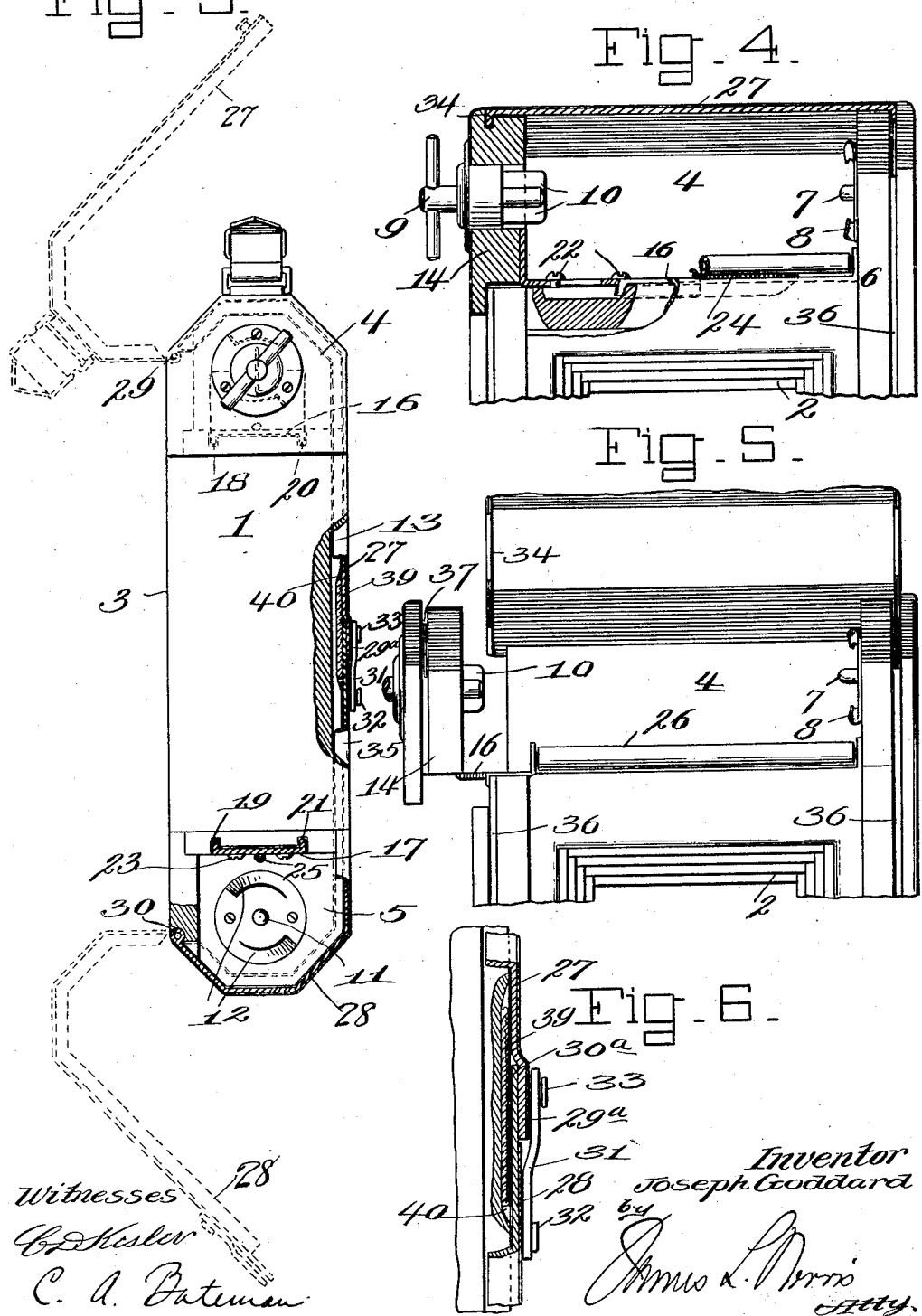

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

PHOTOGRAPHIC CAMERA.

1,068,889.  Specification of Letters Patent.  Patented July 29, 1913.

Application filed July 27, 1912. Serial No. 711,852.

*To all whom it may concern:*

Be it known that I, JOSEPH GODDARD, a citizen of the United States, residing at Rochester, in the county of Monroe and State of New York, have invented new and useful Improvements in Photographic Cameras, of which the following is a specification.

My present invention relates to improvements in photographic cameras and especially those of the pocket folding type adapted to handle rolls or cartridges of flexible film capable of being loaded and unloaded in daylight, and the primary object of the present invention is to provide a simple and improved camera of this type whereby the loading and unloading thereof may be accomplished with the greatest facility, the camera in the preferred embodiment of the invention having a casing provided with a back formed in sections which are hinged respectively at the opposite ends of the casing and overlap or form a light tight joint in the center of the back at which point the back sections may be provided with a catch or other suitable device for retaining them in closed position, the back sections, when opened, affording free access to the film compartments as well as the film passageway across the back of the camera and connecting the film compartments. The back sections of the casing are also flanged to seat in complemental channels or grooves formed in the casing to form a light seal between these parts, and in the preferred construction, the flanged casing sections coöperate with shiftable spool-centering and retaining members whereby such members are locked in operative position when the back sections of the casing are closed.

To these and other ends, the invention consists in certain improvements, and combinations and arrangements of parts, all as will be hereinafter more fully described, the novel features being pointed out particularly in the claims at the end of the specification.

In the accompanying drawings: Figure 1 is a perspective view, partly in section, of a pocket folding camera constructed in accordance with the preferred embodiment of my invention; Fig. 2 represents on an enlarged scale an end view of the camera showing one of the spool chambers, the members for centering and retaining a spool therein, and the coöperating portion of the hinged casing section broken away; Fig. 3 is a top plan view, partly in section, showing the hinged casing sections in closed condition by the full lines and indicating the manner in which these casing sections are opened by the dotted lines; Figs. 4 and 5 represent longitudinal sections through one end of the camera casing showing one of the spool-centering members in operative and inoperative positions respectively; Fig. 6 is an enlarged sectional view showing the lapped joint formed at the meeting ends of the hinged casing sections, the catch for retaining these sections in closed relation, and a packing on the casing to prevent entrance of light to the film through the joint.

Similar parts are designated by the same reference characters in the several views.

The present improvements are capable of application generally to cameras of different types, but they are particularly adapted to cameras of the well known pocket folding type employing spools of flexible film with which the camera can be loaded and unloaded in daylight or without the necessity of using a dark room for this purpose.

The preferred form of the invention is shown in the accompanying drawings and will be hereinafter described in detail, but it is to be understood that the invention is not restricted to the particular details shown, as equivalents thereof may be used within the scope of the claims.

In the present instance, the camera embodies a casing 1 having a central compartment 2 which is adapted to contain the bellows, lens, and coöperative parts when the latter are collapsed within the casing, the front of this central compartment being inclosed by a hinged door 3 which is arranged at the front of the casing and when opened serves in the usual manner as a bed upon which the lens may be extended. A pair of spool compartments 4 and 5 are formed at the opposite ends of the casing and at opposite sides of the central compartment thereof which is adapted to accommodate the lens and bellows, and each of these spool compartments is adapted to contain a film spool, one spool serving to wind the film thereon and the other to unwind the film therefrom as the different exposures are made in the well known manner. In the construction shown, the spool compartment 4 is adapted to contain the winding spool, the stationary section 6 of the camera casing containing a relatively fixed spool-centering pin 7 and also the springs 8 adapted to coöperate with the flanges of the spool, and this compartment is also provided with a spool-winding key 9 the handle of which is exposed at the exterior of the casing, and the inner end of the key is provided with a head 10 which is adapted to couple to the spool in the well known manner whereby the spool may be rotated by manipulation of the winding key. The spool compartment 5 which is adapted to receive the film supply spool may be provided at each end with a spool-centering pin 11 and a spring or friction-tensioning device 12 to coöperate with the flanges of the film supply spool and produce sufficient resistance to the unwinding thereof as to maintain the film taut in the passageway 13 which is located in the rear of the casing and connects the spool compartments. In order to facilitate the application and removal of the film spools with respect to their compartments, it is preferable to employ a member which is movable relatively to the casing and may be retracted to permit the spool to be applied or removed, and when in operative position, it retains the spool in correct position. In the present instance, a pair of slidable spool-retaining members 14 and 15 are provided, these members when in operative position serving to close the respective ends of the spool compartments 4 and 5 and they are guided to and from operative position by guides 16 and 17 which are secured to the respective members and are formed with flanges 18 and 19 which operate in guiding grooves 20 and 21 in the walls of the spool compartments. Screws 22 and 23 operating in slots in the respective guides also serve to limit the movements of the spool-retaining members and assist in guiding the same to and from operative position. Springs 24 and 25 are provided, these springs acting to return the spool-retaining members to normal position after being retracted and for retaining them in such position.

Upon reference to Fig. 4, it will be observed that the spool-retaining member 14 which carries the winding key 9 is shown in position to support and retain the film spool in operative position within the compartment 4, while Fig. 5 shows this same member retracted, the spool-engaging head 10 on the winding key being then separated from the spool-centering pin 8 at the opposite end of the spool compartment and a spool may then be readily removed or inserted between the two spool-engaging devices. 26 designates a roller which is mounted at the point where the film enters the spool compartment 4 after passing through the passageway 13, and a similar roller may be used at the point where the film leaves the spool compartment 5 and enters the passageway 13. The spool compartments 4 and 5 and also the rear of the film passageway 13 are closed in the present instance by a pair of casing sections 27 and 28, these sections being hinged to the casing at the points 29 and 30 respectively, and the sections extend rearwardly past the ends of the spool compartments and thence inwardly or toward one another and across the back of the casing, thereby closing the two spool compartments and also the back of the camera. Preferably, the inner ends of the two casing sections meet and overlap to form a light tight joint, the inner end 29ª of the section 27 being in the present instance bent or offset so as to overlap the coöperative end 30ª of the section 28, a tight joint being thereby produced which permits the sections 27 and 28 to lie in the same plane and to form a tight joint with the back of the camera casing throughout the extent thereof. It is also preferable to provide a catch for holding the meeting or lapped inner ends of the sections 27 and 28 together, a catch 31 being provided in the present instance which is pivoted at 32 to one of the sections, (the section 28 in the construction shown) and this catch has a hook to coöperate with a stud or projection 33 on the other section 27.

In order to form a light tight joint between the casing and the hinged sections 27 and 28, these sections are provided as shown with marginal inturned and continuous flanges 34 and 35 respectively, and these flanges are accommodated in grooves or channels 36 which extend continuously across the back of the camera casing at the two parallel edges thereof. In the preferred construction, these flanges 34 and 35 also serve to lock the spool-retaining members 14 and 15 in operative position, and for this purpose, these members are formed with grooves or channels 37 and 38 which are continuations of the corresponding groove or channel 36. Obviously, when the hinged casing sections 27 and 28 are in closed position, the flanges thereon will coöperate with the grooves or channels in the spool-retaining members and will thereby lock the same in operative position as well as to form light tight joints therewith, although if desired, the springs acting on these members may be utilized to retain them in operative position. In order to prevent leakage of light to the film past the joint formed by the lapping of the inner ends of the casing sections 27 and 28 in the center of the back of the camera, strips of packing 39 may be set into slots or recesses 40 in the back of the camera casing, as shown particularly in Fig. 6.

I claim as my invention:—

1. In a photographic camera, the combination of a casing having spool compartments at opposite ends thereof and an exposing chamber between said compartments, and a pair of closure sections hinged to the casing at points adjacent to the respective compartments and serving to uncover and to close said compartments and the exposing chamber of the casing.

2. In a photographic camera, the combination of a casing having spool compartments at the ends thereof and a film passageway and exposing chamber at the rear and connecting said compartments, and a pair of hinged doors controlling access to said compartments and having their free ends extending across the back of the camera to close said film passageway.

3. In a photographic camera, the combination of a casing having spool compartments at the ends thereof and a film passageway and exposing chamber at the rear connecting said compartments, and a pair of closure sections hinged to the casing toward opposite ends thereof and extending across and closing the compartments and also having their free ends extending across said film passageway at the rear, the free ends of said sections meeting and forming a light-tight joint at the middle of the back of the camera.

4. In a photographic camera, the combination of a casing having spool compartments at the ends thereof and a film passageway at the rear connecting said compartments, and a pair of closure sections hinged to the casing toward opposite ends thereof and closing the compartments and film passageway, the free ends of the sections meeting in the middle of said film passageway and having means for securing them in closed position.

5. In a photographic camera, the combination of a casing having spool compartments at the ends thereof and a film passageway at the rear and connecting the compartments, the rear edges of the casing having grooves extending forwardly therein, and closure sections hinged to the casing adjacent to the spool compartments and closing the same and the back of the camera, said sections having marginal flanges coöperative with the walls of the grooves in the casing to form a light tight joint therewith.

6. In a photographic camera, the combination of a casing having spool compartments at the ends thereof and a film passageway at the rear and connecting the compartments, the rear edges of the casing having forwardly extending grooves therein, spool-retaining members movably connected to the casing and having grooves continuous with one of said grooves of the casing, and a pair of closure sections hinged to the casing adjacent to the respective spool compartments and closing the same and the back of the casing, said sections having marginal inturned flanges seating in said grooves in the casing and the spool-retaining members and coöperative with the walls of said grooves to form light tight joints therewith and to lock said members in operative position.

In testimony whereof I have hereunto set my hand in presence of two subscribing witnesses.

JOSEPH GODDARD.

Witnesses:
MABEL L. HACKETT,
NELLIE A. BRANNIGAN.

---

Copies of this patent may be obtained for five cents each, by addressing the "Commissioner of Patents, Washington, D. C."